May 23, 1939.  J. A. HOWARD  2,159,213

UPHOLSTERY PADDING MATERIAL

Filed Jan. 30, 1937

Inventor
JOSEPH ARTHUR HOWARD
BY: Francis E. Boyce
ATTORNEY

Patented May 23, 1939

2,159,213

UNITED STATES PATENT OFFICE 2,159,213

UPHOLSTERY PADDING MATERIAL

Joseph Arthur Howard, London, England, assignor of one-third to The Moulded Hair Company Limited, London, England, and one-third to Josef Anton Talalay, Bedford, England Application January 30, 1937, Serial No. 123,232
In Great Britain February 10, 1936

4 Claims. (Cl. 18—53)

This invention relates to upholstery padding material which consists of loosely associated upholstery fibres, such as curled horsehair, individually sheathed and preferably held together by an adhesive, for instance rubber deposited thereon from an aqueous dispersion.

The object of the invention is to improve the resiliency of an upholstery padding material of the above kind.

It has already been proposed to incorporate fibrous material in cellular rubber produced directly from an aqueous dispersion of rubber, either cellular rubber with unbroken cells or rubber with broken cells, namely sponge rubber, including rubber of a stereoreticulated structure.

Now if the fibres are incorporated in the latex mix for producing the cellular rubber prior to the formation of the cells in the mix, or if the latex mix is allowed to rise over the fibres, the distribution of the fibres throughout the final cellular product will be indeterminate.

More particularly the object of the invention is to enable a loose association of the fibres of a mass of fibres, to be retained in a cellular rubber structure, formed directly from an aqueous dispersion of rubber and embedding such mass of fibres.

For the above purpose, according to the invention, in the production of a cellular rubber structure directly from an aqueous dispersion of rubber and embedding a mass of fibres, the fibres are individually sheathed with a stiffening coating and arranged in an open loosely associated condition, and subsequently an aqueous dispersion of rubber is introduced into the interstices between the fibres and a cellular rubber structure is formed within the interstices directly from the aqueous dispersion.

Preferably for the effective retention of the open condition of the mass of fibres, the individual fibres, in addition to being individually sheathed, are also held together by the coating.

Conveniently, the fibres in the open loosely associated condition are individually sheathed and held together by plain rubber deposited from latex.

The initial coating of the fibres need not be flexible, for even if the fibres are initially sheathed or sheathed and held together by a brittle coating, such as a coating of shellac or brittle glue, such coating will not restrict the flexibility of the final cellular rubber structure, for the brittle coating will become broken into fragments on eventual distortion of the final mass.

A cellular rubber latex mix is introduced into the interstices of an open mass of the sheathed or sheathed and interconnected fibres so that on frothing a cellular structure is formed spreading through the interstices of the open mass of fibres.

The cellular rubber latex mix before or after frothing thereof may be spread over one or more surfaces of the mass of rubberised fibres and introduced into the interstices thereof, or may be poured into the mass.

The cellular rubber with the embedded mass of open loosely associated sheathed or sheathed and interconnected fibres may be shaped, by moulding by hand or by confinement in a mould or otherwise, to the shape of the desired upholstery body or pad. Alternatively, the mass of open loosely associated sheathed or sheathed and interconnected fibres may be in the form of a continuous web, in the interstices of which the cellular rubber structure is formed from the cellular rubber latex mix. The web of cellular rubber with embedded loosely associated fibres is cut to shape when the cellular rubber has set or after it has been vulcanised.

Even when the final cellular rubber structure is moulded to a definite shape, the initial mass of sheathed and interconnected fibres need not be initially moulded to that shape, but can be composed of a number of disconnected pieces which eventually become interconnected by the cellular rubber.

The mass of fibres sheathed with rubber may be vulcanised prior to the application thereto of the cellular rubber latex mix, or vulcanisation can be deferred until after the final cellular rubber structure has been formed, whereby the whole is submitted to conjoint vulcanisation.

The interstices between the fibres become more or less occupied by the cellular rubber.

Any available method of causing latex to froth and produce and set as a cellular rubber structure, by reason of its constituents or by reason of the temperature to which it is exposed, and any method of introducing same into the fibrous mass, can be employed to produce the cellular rubber structure embedding the fibres.

The invention is illustrated, somewhat diagrammatically, on the accompanying drawing, in which:—

Figure 3:
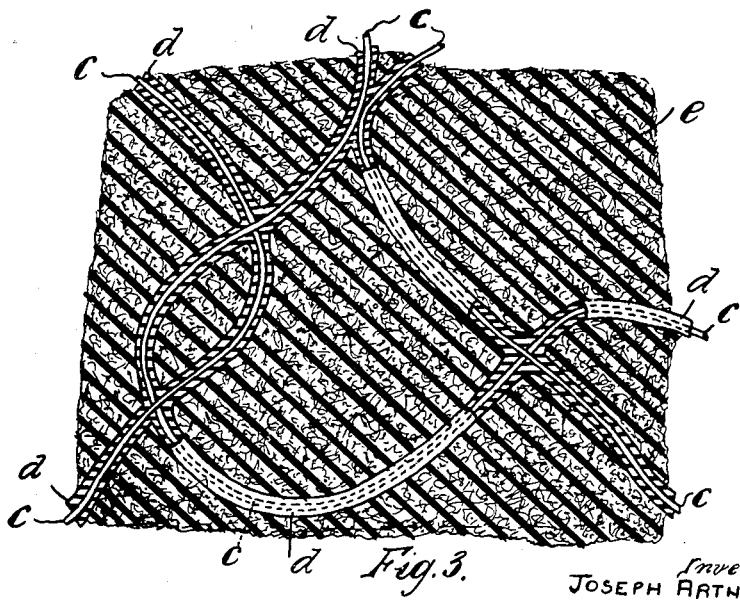
Fig. 3 is a fragmentary section on an exaggerated scale showing the final constitution of the upholstery material.

a is a mould which is initially filled with an open mass b of upholstery fibres c, Fig. 3, such as curled horsehair, individually sheathed and interconnected at their crossing points by plain rubber d, Fig. 3, deposited from latex.

The mass b of rubberised fibres is for example already shaped, by a previous moulding operation, to the shape of the mould a.

Figure 1:
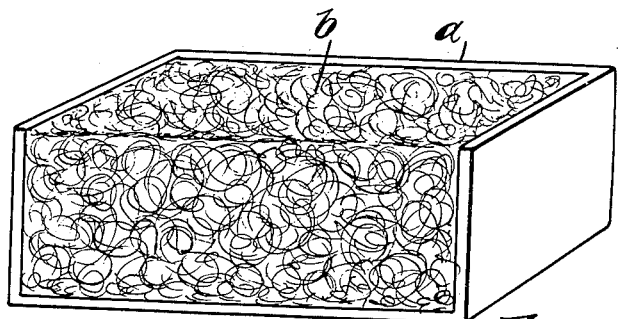
Fig. 1 is a perspective view of a mould with one side removed, occupied by an open mass of rubberised upholstery fibres.
Figure 2:
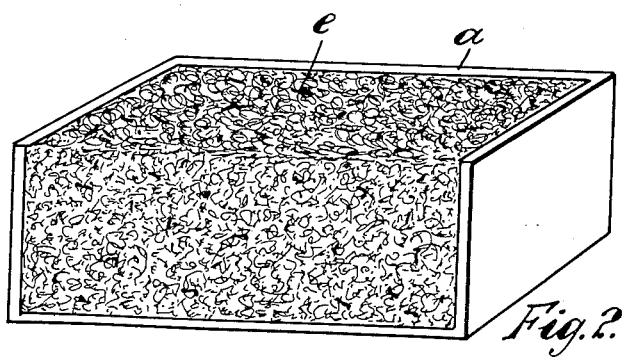
Fig. 2 is a view similar to Fig. 1 showing the interstices of the mass occupied by cellular rubber.

A latex mix adapted to froth and produce a cellular rubber structure is introduced into the interstices of the mass b of rubberised fibres, and after formation of the cellular rubber structure, forms a cellular rubber mass e, Fig. 2, embedding the rubberised fibres.

The structure of the cellular rubber mass e embedding fibres c individually sheathed and interconnected by plain rubber d, is diagrammatically shown on an enlarged scale in Fig. 3.

The expression "rubber" is intended to include analogous hydrocarbons, whether natural or artificial, capable of being employed in an aqueous dispersion or as a solution.

I claim:

1. A method of producing a cellular rubber structure from an aqueous dispersion of rubber and embedding a mass of fibres, consisting in individually sheathing with a stiffening coating and arranging fibres in an open loosely associated condition, and subsequently introducing into the interstices between said fibres an aqueous dispersion of rubber and forming directly from said aqueous dispersion a cellular rubber structure within said interstices.

2. A method of producing a cellular rubber structure from an aqueous dispersion of rubber and embedding a mass of fibres, consisting in individually sheathing and interconnecting by plain rubber deposited from an aqueous dispersion and arranging fibres in an open loosely associated condition, and subsequently introducing into the interstices between said fibres an aqueous dispersion of rubber and forming directly from said aqueous dispersion a cellular rubber structure within said interstices.

3. An upholstery body consisting of a mass of loosely associated upholstery fibres individually sheathed with a coating other than of cellular rubber, and a mass of cellular rubber embedding said sheathed fibres individually.

4. An upholstery body consisting of a mass of loosely associated upholstery fibres individually sheathed with and interconnected by a coating of plain rubber, and a mass of cellular rubber embedding said sheathed fibres individually.

JOSEPH ARTHUR HOWARD.